United States Patent [19]
Headley

[11] Patent Number: 5,489,349
[45] Date of Patent: Feb. 6, 1996

[54] GRAINS OF GAS GENERATING MATERIAL AND PROCESS FOR FORMING THE GRAINS

[75] Inventor: Paul S. Headley, Mesa, Ariz.

[73] Assignee: TRW Inc., Lyndhurst, Ohio

[21] Appl. No.: 417,994

[22] Filed: Apr. 6, 1995

[51] Int. Cl.$^6$ ................................ C06B 35/00
[52] U.S. Cl. .................... 149/35; 149/109.6; 264/3.4
[58] Field of Search ................... 149/109.6, 35; 264/3.4; 23/313 R

[56] References Cited

U.S. PATENT DOCUMENTS

| 3,754,060 | 8/1973 | Gawlick et al. |
|---|---|---|
| 3,920,575 | 11/1975 | Shiki et al. |
| 3,954,062 | 5/1976 | Dunlop et al. |
| 4,279,672 | 7/1981 | Leneveu ................... 149/19.8 |
| 4,326,901 | 4/1982 | Leneveu ................... 149/12 |
| 4,519,855 | 6/1985 | Leneveu et al. ................... 149/21 |
| 4,817,828 | 4/1989 | Goetz. |
| 4,994,212 | 2/1991 | Vos et al. |
| 4,999,063 | 3/1991 | Vos et al. |
| 5,034,070 | 7/1991 | Goetz et al. |
| 5,051,143 | 9/1991 | Goetz. |
| 5,084,218 | 1/1992 | Vos et al. |
| 5,174,837 | 12/1992 | Boileau ................... 149/19.91 |
| 5,346,254 | 9/1994 | Esterberg. |

Primary Examiner—Ngoclan Mai
Assistant Examiner—Anthony R. Chi
Attorney, Agent, or Firm—Tarolli, Sundheim & Covell

[57] ABSTRACT

A process for forming a grain (10) of gas generating material includes the step of forming pieces (86) of gas generating material, and further includes the step of forming the grain (10) as a compacted agglomeration of the pieces (86) of gas generating material. The pieces (86) of gas generating material are formed by pressing a particle mixture (60) under a first pressure. The grain (10) is formed by pressing the pieces (86) together under a second pressure which is less than the first pressure.

16 Claims, 5 Drawing Sheets

GRAINS OF GAS GENERATING MATERIAL AND PROCESS FOR FORMING THE GRAINS

FIELD OF THE INVENTION

The present invention relates to grains of gas generating material which, when ignited, generate gas for inflating an inflatable vehicle occupant restraint. The present invention further relates to a process for forming the grains of gas generating material.

BACKGROUND OF THE INVENTION

An ignitable gas generating material is used to provide inflation gas for inflating a vehicle occupant restraint such as an air bag. The gas generating material is prepared as a mixture of particles which together include the ingredients of the gas generating material. A solid body of gas generating material, known as a grain, is formed from the particle mixture.

A plurality of grains of gas generating material are contained in an air bag inflator. The inflator has an initiator which ignites the grains of gas generating material when the air bag is to be inflated. As the grains of gas generating material burn in the inflator, they rapidly generate a large volume of inflation gas. The inflation gas is directed outward from the inflator and into the air bag to inflate the air bag.

When the grains of gas generating material are ignited in the inflator, the brisance from the initiator may cause the grains to crack or break apart. As a result, the combustible surface areas of the grains are increased. The rate at which the combustion of the gas generating material proceeds, and consequently the rate at which the inflation gas is generated, is increased accordingly.

SUMMARY OF THE INVENTION

The present invention comprises a grain of gas generating material which, when ignited, generates gas for inflating an inflatable vehicle occupant restraint. The present invention further comprises a process for forming the grain of gas generating material.

In accordance with the present invention, the process for forming the grain of gas generating material initially forms a plurality of separate pieces of gas generating material. The separate pieces of gas generating material are formed in steps which include the step of pressing quantities of a particle mixture under a first pressure. The pieces of gas generating material thus comprise forcefully compacted agglomerations of particles.

The process subsequently forms the grain of gas generating material by pressing the separate pieces together under a second pressure which is less than the first pressure. The grain of gas generating material thus comprises a less forcefully compacted agglomeration of pieces of gas generating material.

In accordance with the present invention, the second pressure does not crush the pieces of gas generating material into the separate particles of which they are formed. The pieces thus remain generally distinct from each other as agglomerated parts of the grain, and are separable from each other by the brisance which results from ignition of the grain. As a result, ignition of the grain causes the grain to shatter into predetermined, separated pieces, rather than merely to crack or break apart as known in the prior art. The predetermined, separated pieces of the grain beneficially provide a greatly increased surface area for combustion of the gas generating material. The resulting generation of inflation gas proceeds at a correspondingly greater rate.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

Figure 1:
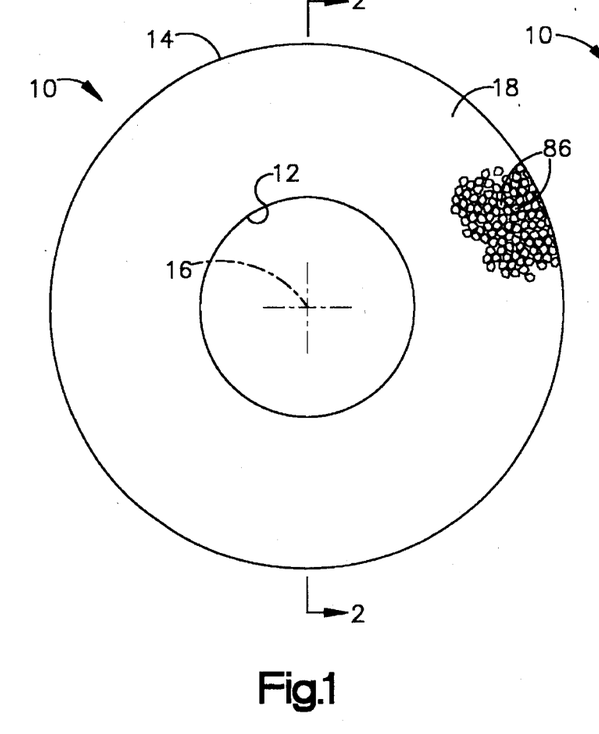
FIG. 1 is a view of a grain of gas generating material comprising a preferred embodiment of the present invention.
Figure 2:
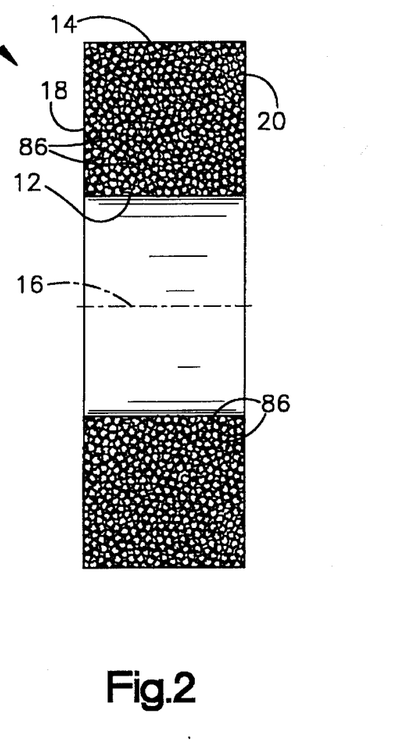
FIG. 2 is a view taken on line 2—2 of FIG. 1.

A solid body 10 of gas generating material, known as a grain, comprising a preferred embodiment of the present invention is shown in FIGS. 1 and 2. The gas generating material of which the grain 10 is formed is an ignitable material which rapidly generates a large volume of gas when ignited. The grain 10 comprises a source of gas for inflating an inflatable vehicle occupant restraint such as an air bag.

The grain 10 is shaped as a ring with cylindrical inner and outer surfaces 12 and 14 centered on an axis 16. The grain 10 further has first and second opposite side surfaces 18 and 20. Each of the side surfaces 18 and 20 is centered on the axis 16 and is generally perpendicular to the axis 16.

In the preferred embodiment of the present invention, the grain 10 is constructed specifically for inflating an air bag at the driver's side of a vehicle. The grain 10 is thus constructed for use in an air bag inflator which is mounted on a vehicle steering column so as to inflate the air bag between the steering column and the driver of the vehicle. As shown by way of example in FIG. 3, such an inflator 30 includes a short cylindrical housing 32 and an initiator 34. The initiator 34 is a known part with an elongated cylindrical casing 36 and a pair of electrical lead wires 38. The initiator casing 36 contains a pyrotechnic charge and extends into a combustion chamber 40 at the center of the housing 32. One or more (preferably two) of the ring-shaped grains 10 of gas generating material are contained in the combustion chamber 40, and are received concentrically over the initiator casing 36. A plurality of gas flow openings 42 communicate the combustion chamber 40 with a surrounding filtration chamber 44. The filtration chamber 44 communicates with the exterior of the housing 32 through a plurality of gas outlet openings 46. A filter assembly 48 (shown schematically) is contained in the filtration chamber 44 between the gas flow openings 42 and the gas outlet openings 46.

Figure 3:
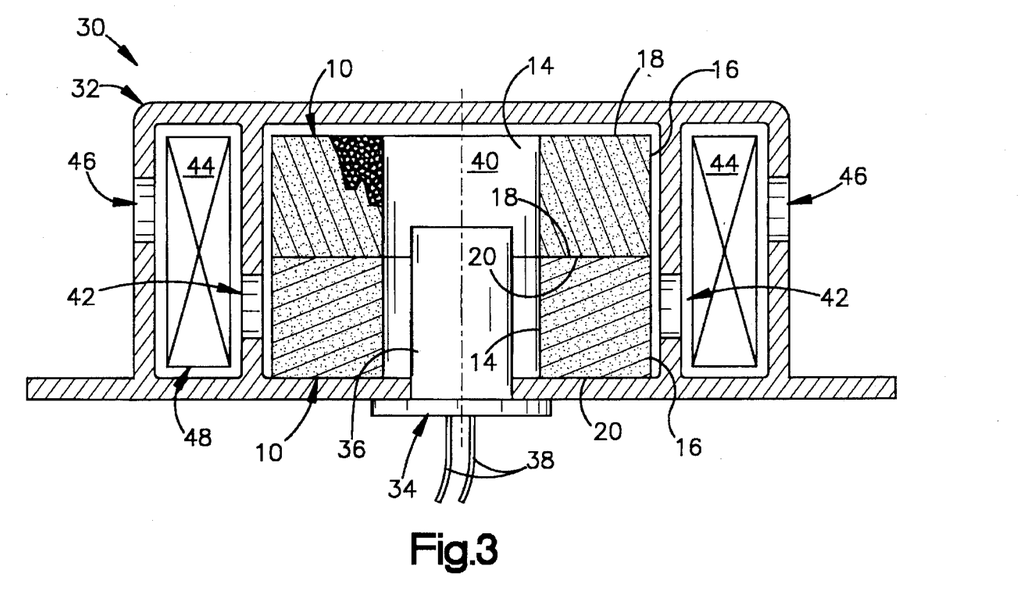
FIG. 3 is a schematic view of an inflator containing grains of gas generating material like the grain of FIG. 1.

As known in the art, the inflator 30 is actuated in response to a vehicle condition indicating the occurrence of a collision. The collision-indicating condition may comprise, for example, sudden vehicle deceleration caused by a collision. If the collision-indicating condition is above a predetermined threshold, it indicates the occurrence of a collision for which inflation of the air bag is desired to protect the driver of the vehicle. Electric current is then directed through the initiator 34 between the lead wires 38. The pyrotechnic charge in the casing 36 is then ignited and produces combustion products which rupture the casing 36 and move throughout the combustion chamber 40 to ignite the grains 10 of gas generating material. As the grains 10 of gas generating material burn in the combustion chamber 40, they rapidly generate a large volume of gas. The gas flows outward from the combustion chamber 40 to the filtration chamber 44 through the gas flow openings 42, through the filter assembly 48 in the filtration chamber 44, and further outward from the housing 32 through the gas outlet openings 46.

The gas generating material of which the grains 10 are formed may have any suitable composition known in the art. However, in the preferred embodiment of the present invention, the ingredients of the gas generating material include a fuel and a primary oxidizer. The fuel is a source of nitrogen gas, and is preferably an alkali metal azide, such as sodium azide, potassium azide or lithium azide. Sodium azide is the most preferred alkali metal azide. The primary oxidizer is a primary source of oxygen, and preferably is a metal oxide. The metal of the metal oxide may be any metal which is lower in the electromotive series than the alkali metal. Examples of preferred metals for the metal oxide are copper, iron, manganese, tin, titanium, and nickel, and combinations of such metals. The most preferred primary oxidizer is cupric oxide.

The ingredients of the gas generating material further include a secondary oxidizer. The secondary oxidizer may be an alkali metal nitrate, chlorate, and/or perchlorate, or combinations of the foregoing. As known in the art, other ingredients, such as strengthening fibers, may also be included. If strengthening fibers are included, graphite fibers are preferred but glass fibers and/or iron fibers could be used.

The ingredients of the gas generating material are mixed together in particulate form to produce a homogeneous mixture of particles. The particles in the mixture preferably have sizes within a range extending from approximately 20 to approximately 40 microns.

A process for forming the grains 10 of gas generating material in accordance with the present invention is shown schematically in FIGS. 4–7. First, a loose batch 60 of the particle mixture is processed in a roll compactor 62, as shown schematically in FIG. 4. The roll compactor 62 is a known apparatus which includes a feeder hopper 64 and first and second compaction rollers 66 and 68. The roll compactor 62 further includes a motor 70 and a collection hopper 72. As indicated by the arrows shown in FIG. 4, the first and second compaction rollers 66 and 68 are driven by the motor 70 to rotate in opposite directions about first and second axes 74 and 76, respectively. The compaction rollers 66 and 68 adjoin an outlet opening 78 at the bottom of the feeder hopper 64. A nip 80 is defined between the compaction rollers 66 and 68 directly beneath the outlet opening 78. The collection hopper 72 is located directly beneath the nip 80.

Figure 5:
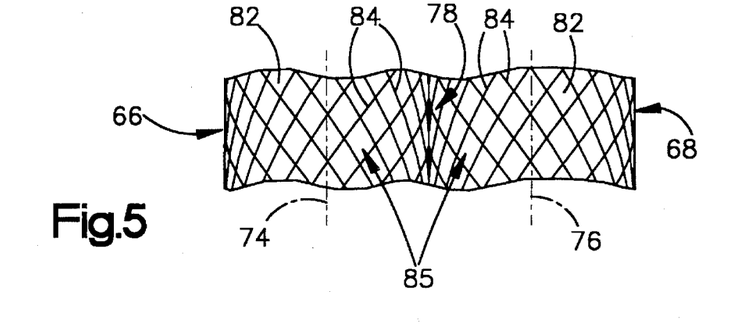
FIG. 5 is a partial top view of parts of the apparatus of FIG. 4.

As shown partially in FIG. 5, each of the compaction rollers 66 and 68 has a smooth cylindrical surface 82 and a plurality of raised ribs 84. The cylindrical surface 82 and the ribs 84 together define a plurality of open compartments 85. Each compartment 85 has a bottom at the cylindrical surface 82, and is bounded on four sided by the adjacent ribs 84.

Figure 4:
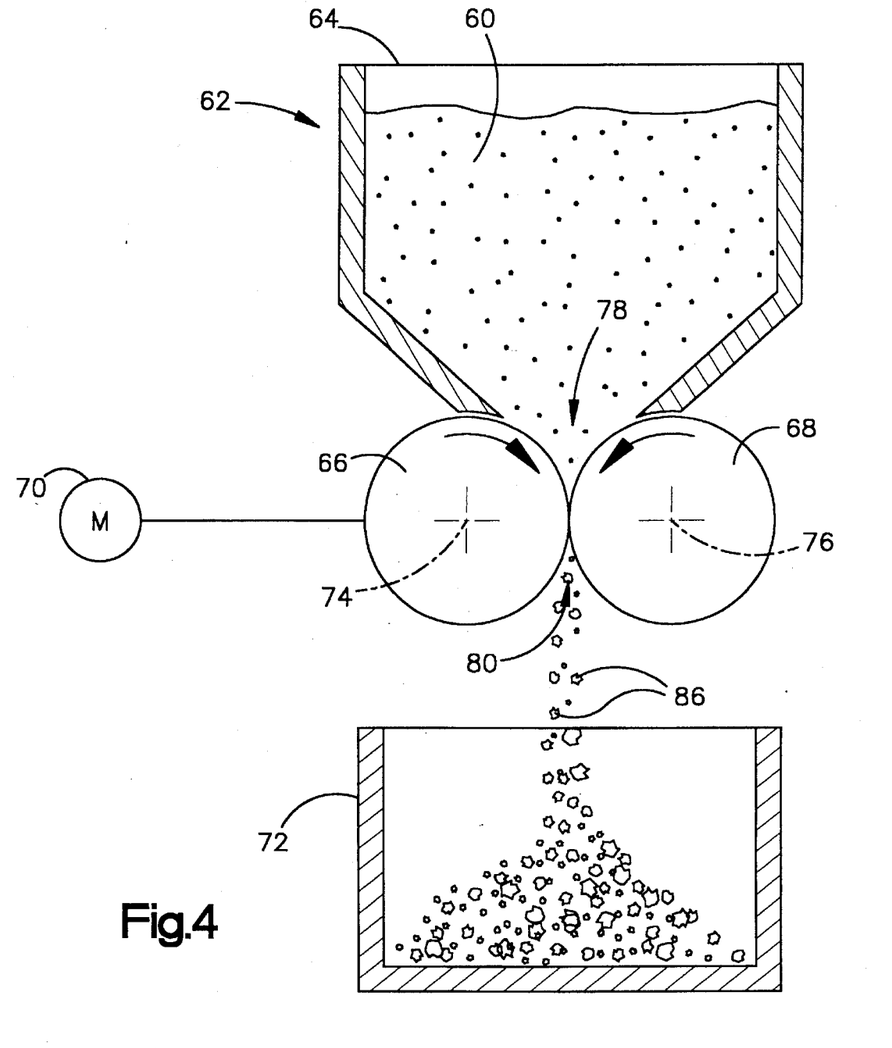
FIG. 4 is a schematic view of an apparatus used in a process of forming the grain of FIG. 1 in accordance with the present invention.

The roll compactor 62 operates to form the loose batch 60 of particle mixture into a plurality of separate pieces 86 of gas generating material. The separate pieces 86 are formed as the loose batch 60 of particle mixture is moved downward from the feeder hopper 64 through the nip 80 between the compaction rollers 66 and 68 upon rotation of the compaction rollers 66 and 68. Specifically, the compartments 85 move beneath the outlet opening 78 when the compaction rollers 66 and 68 rotate. Quantities of the particle mixture then flow into the compartments 85. As the compaction rollers 66 and 68 continue to rotate, the compartments 85 carry those quantities of particle mixture downward between the compaction rollers 66 and 68 through the nip 80. When those quantities of particle mixture are thus moved between the compaction rollers 66 and 68, they are forcefully pressed against the cylindrical surfaces 82 at the bottoms of the compartments 85. The particles in those quantities are then compacted together sufficiently to adhere to each other within the compartments 85. When the compartments 85 subsequently move downward away from the nip 78, the compacted quantities of particle mixture drop from the compartments 85 in the form of the separate pieces 86. Each of the separate pieces 86 is thus formed as a forcefully compacted agglomeration of the particles in a corresponding quantity of the loose batch 60 of particle mixture.

Figure 6:
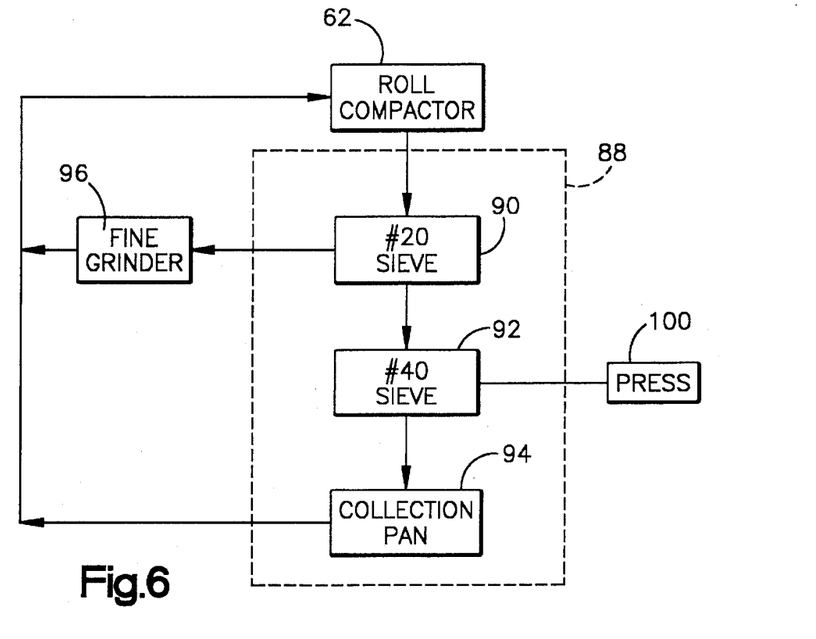
FIG. 6 is a block diagram showing steps taken in the process of forming the grain of FIG. 1.

The separate pieces 86 of gas generating material formed in the roll compactor 62 are subsequently sorted in a sieve assembly 88, as shown schematically in FIG. 6. The sieve assembly 88 preferably includes a first sieve 90, a second sieve 92, and a collection pan 94.

As the pieces 86 of gas generating material are sorted in the sieve assembly 88, a first sieved batch of pieces 86 is retained by the first sieve 90. A second sieved batch of pieces 86 passes through the first sieve 90 and is retained by the second sieve 92. A third sieved batch of pieces 86 passes through the second sieve 92 and is collected by the collection pan 94. Accordingly, the pieces 86 in the first sieved batch are the largest. Those pieces 86 are ground back into separate particles by a fine grinder 96 and are subsequently recycled through the roll compactor 62. The pieces 86 in the third sieved batch are the smallest. Those pieces also are recycled through the roll compactor 62. The pieces 86 in the second sieved batch have intermediate sizes within a predetermined range defined by the two sieves 90 and 92. Those pieces 86 are transferred to a press 100. Preferably, the first sieve 90 is a number 20 sieve and the second sieve 92 is a number 40 sieve. The pieces 86 that are transferred to the press 100 thus have sizes within a range extending between a number 40 sieve size to a number 20 sieve size.

Figure 7:
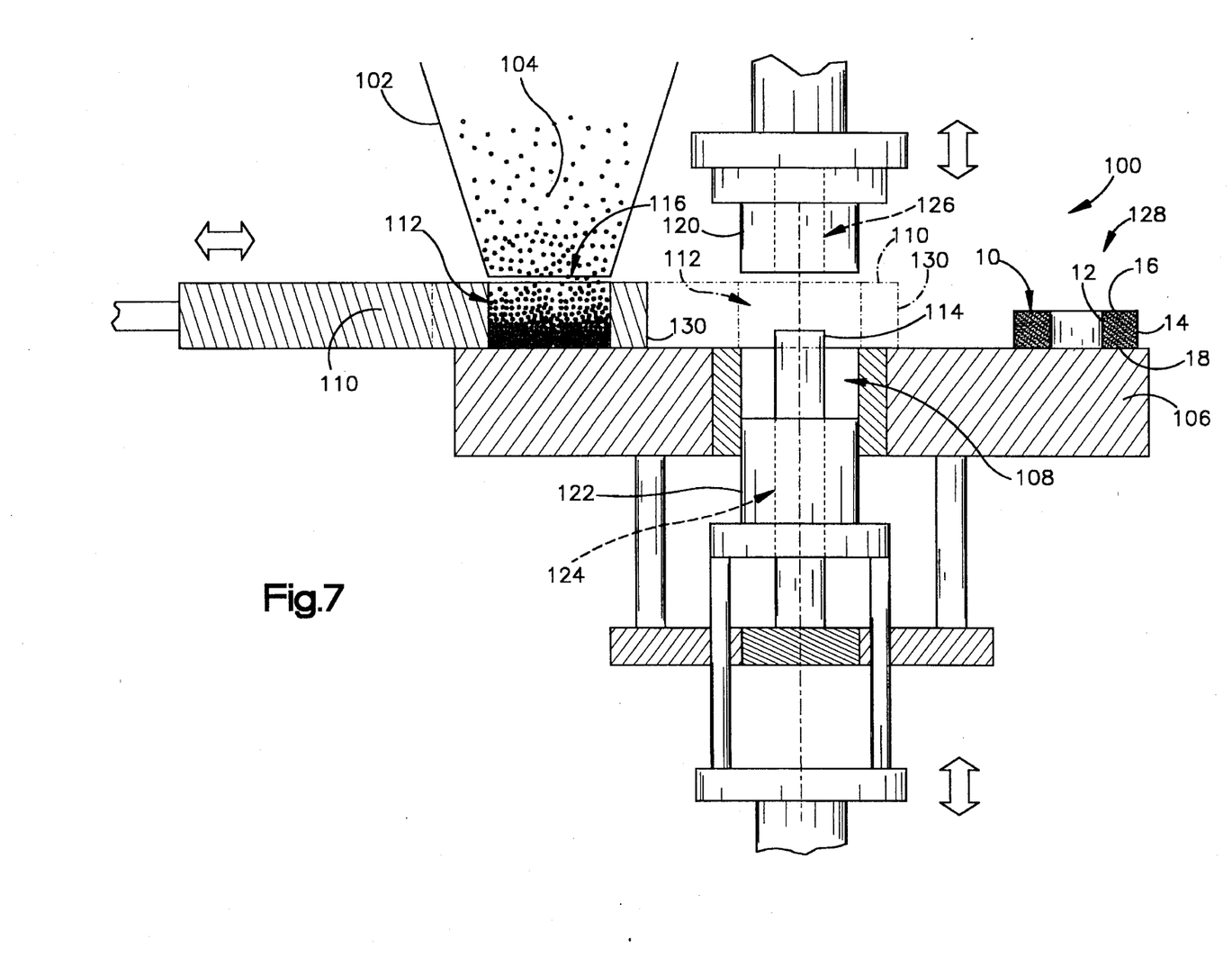
FIG. 7 is a schematic view of another apparatus used in a process of forming the grain of FIG. 1.

As shown in FIG. 7, the press 100 has a feeder hopper 102. The feeder hopper 102 receives a loose batch 104 of the separate pieces 86 of gas generating material that are transferred from the sieve assembly 88 to the press 100. Other parts of the press 100 include a stationary die 106 with a die cavity 108, and a movable feeder shoe 110 with a charge cavity 112. The charge cavity 112 has a cylindrical shape with a diameter equal to the diameter of the cylindrical outer surface 14 (FIG. 1) of the grain 10 of gas generating material. The die cavity 108 is shaped as a ring with an outer diameter equal to the diameter of the cylindrical outer surface 14 of the grain 10. A cylindrical shaft 114 extends vertically through the center of the die cavity 108 and defines the inner diameter of the die cavity 108. The inner diameter of the die cavity 108 is equal to the diameter of the cylindrical inner surface 12 of the grain 10.

The feeder shoe 110 is reciprocated horizontally between a first position, as shown in solid lines in FIG. 7, and a second position, as shown in dashed lines in FIG. 7. When the feeder shoe 110 is in the second position, the charge cavity 112 is located directly above the die cavity 108. When the feeder shoe 110 is in the first position, the charge cavity 112 is located directly beneath an outlet opening 116 at the bottom of the feeder hopper 102. A loose quantity of the separate pieces 86 of gas generating material then flows by gravity from the feeder hopper 102 into the charge cavity 112. When the feeder shoe 110 has been moved from the first position to the second position, the loose quantity of pieces 86 flows by gravity from the charge cavity 112 into the die cavity 108. The pieces 86 of gas generating material flow around the stationary shaft 114 and fill the die cavity 108 completely. When the die cavity 108 has been filled, the feeder shoe 110 is returned to the first position to receive another loose quantity of pieces 86 from the feeder hopper 102.

The press 100 further includes upper and lower die plates 120 and 122. The die plates 120 and 122 are ring-shaped members with outer diameters equal to the outer diameter of the die cavity 108. The shaft 114 extends closely through a central passage 124 in the lower die plate 122. The upper die plate 120 has a central passage 126 aligned vertically with the shaft 114.

As indicated by the arrows shown in FIG. 7, the die plates 120 and 122 are reciprocated vertically into and out of the die cavity 108. When the lower die plate 122 moves upward into the die cavity 108, it slides upward along the shaft 114. When the upper die plate 120 moves downward into the die cavity 108, it slides downward over the shaft 114 as the shaft 114 is received closely in the central passage 126 in the upper die plate 120. The die plates 120 and 122 are thus pressed forcefully against the pieces 86 of gas generating material in the die cavity 108.

The pressure applied to the pieces 86 of gas generating material by the die plates 120 and 122 causes the pieces 86 to adhere to each other. A grain 10 of gas generating material is thus formed as a forcefully compacted agglomeration of the pieces 86 in the die cavity 108. After the grain 10 is formed, the upper die plate 120 is moved back upward out of the die cavity 108. The lower die plate 122 is moved further upward through the die cavity 108 to eject the grain 10 from the die cavity 108. The grain 10 is subsequently moved to a discharge location 128 by the leading end 130 of the feeder shoe 110 upon the next movement of the feeder shoe 110 from the first position to the second position.

When a grain 10 of gas generating material is formed in the press 100 in the foregoing manner, the pressure applied to the separate pieces 86 of gas generating material is most preferably within the range of approximately 7 to approximately 14 tons per square inch. Importantly, the pressure applied to the pieces 86 in the press 100 is less than the pressure applied to the particles that are compacted together to form the pieces 86 in the roll compactor 62. The pressure applied to the pieces 86 in the press 100 does not crush them substantially into the separate particles of which they are formed. The pieces 86 of gas generating material thus remain substantially within the predetermined range of sizes, and remain generally distinct from each other, when adhered together as agglomerated parts of the grain 10. As a result, the pieces 86 are separable and dispersable from each other by the brisance which results from actuation of the initiator 34 in the inflator 30 (FIG. 3). The grain 10 is thus shattered into a great number of dispersed, separated pieces 86 within a predetermined range of sizes when the grain 10 is ignited. The dispersed, separated pieces 86 beneficially provide a greatly increased surface area which causes the combustion of the gas generating material, and the resulting generation of inflation gas, to proceed at a correspondingly greater rate.

As an additional benefit of the present invention, the shattering of the grain 10 into the great number of small, separate pieces 86 enables the grains 10 in the inflator 30 (FIG. 3) to be larger, i.e., axially thicker between the opposite side surfaces 18 and 20, than prior art grains. Accordingly, a lesser number of the grains 10 can be used in an air bag inflator. For example, the inflator 30 includes only two of the grains 10, as noted above.

Figure 8:
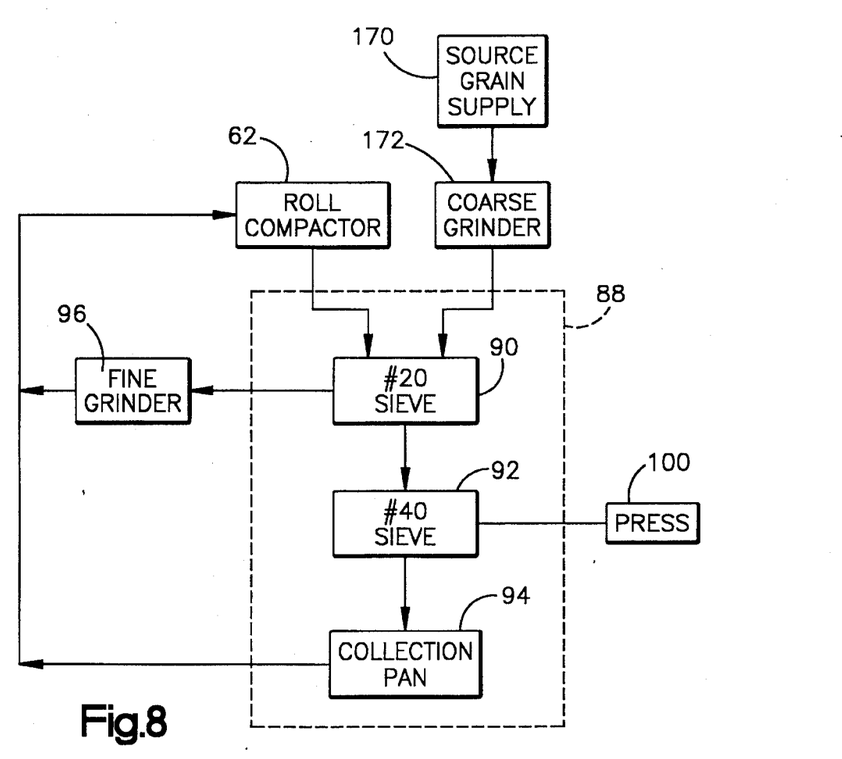
FIG. 8 is a block diagram showing a variation of the process of FIG. 6.
Figure 9A:
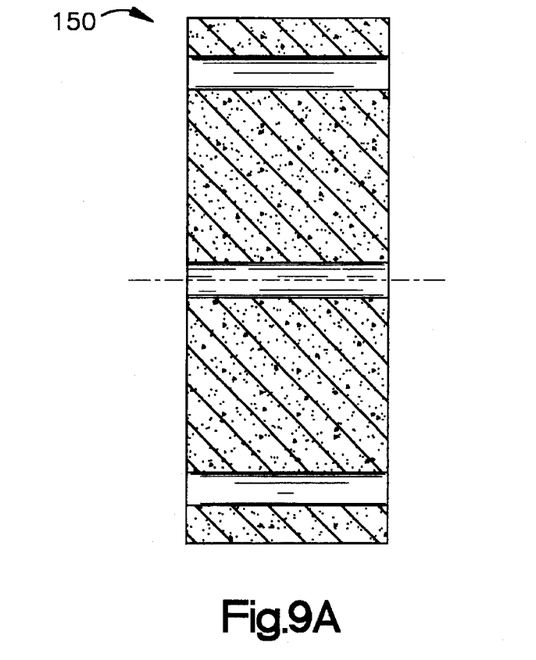
FIGS. 9A and 9B are views of preexisting grains of gas generating material which are recycled in the process of FIG. 8.

A variation of the foregoing process is shown schematically in the block diagram of FIG. 8. In the modified process, a plurality of preexisting grains of gas generating material are recycled to form the grains 10. By way of example, one such recyclable grain 150 of gas generating material is shown in FIG. 9A. Like the grains 10 described above, the grain 150 is formed from a particle mixture with a known composition. However, unlike the grains 10, the grain 150 is not formed by pressing together separate pieces of gas generating material which, in turn, have been formed by pressing loose quantities of the particle mixture. Instead, the grain 150 is formed in a known manner by pressing a quantity of the particle mixture directly into the form of a grain. The grain 150 can thus be formed in the press 100 of FIG. 7 or in any suitable alternative press known in the art.

Figure 9B:
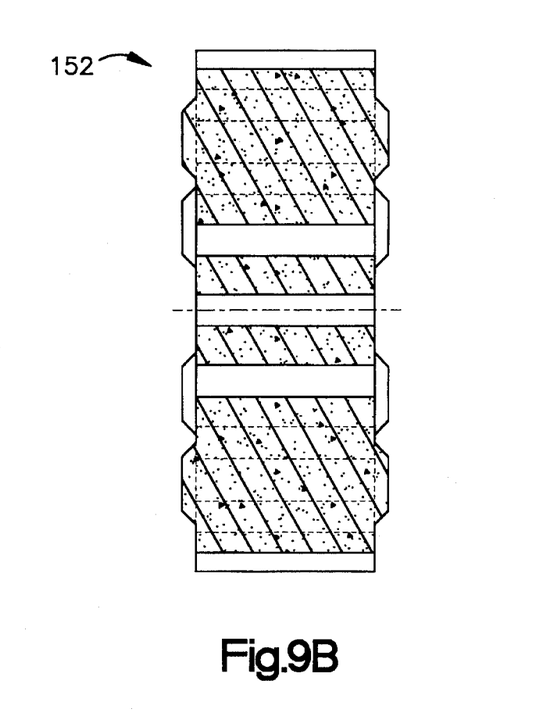

Another preexisting, recyclable grain 152 of gas generating material is shown in FIG. 9B. The grain 152 is formed by pressing together a plurality of granules of gas generating material. The granules are formed by extruding a wet mixture of particles which define the gas generating material, and by shaping the extrudate into small spheres. A known process for forming such granules is disclosed in U.S. Pat. No. 5,084,218, assigned to TRW Vehicle Safety Systems Inc., and entitled "SPHERONIZING PROCESS." In that process, the granules are compacted in a press like the press 100 (FIG. 7) to form the grain 152.

With further reference to FIG. 8, a source batch 170 of grains is defined by a plurality of preexisting, recyclable grains such as the grains 150 and/or the grains 152. The grains in the source batch 170 are processed in a coarse grinder 172. The coarse grinder 172 grinds the grains into separate pieces of gas generating material. The separate pieces of gas generating material produced by the coarse grinder 172 of FIG. 8 are similar to the separate pieces 86 of gas generating material produced by the roll compactor 62 of FIG. 4. Therefore, the separate pieces produced by the coarse grinder 172 are processed in the method of FIG. 8 in the same manner that the separate pieces 86 are processed in the method of FIG. 6. Specifically, the separate pieces produced by the coarse grinder 172 are sorted in the sieve assembly 88. The sorted pieces that are not within the predetermined range of sizes are recycled through the fine grinder 96 and the roll compactor 62, as described above. The sorted pieces that are within the predetermined range of sizes are transferred to the press 100.

In the process of FIG. 8, the pieces 86 of gas generating material that are transferred to the press 100 are pressed together under a pressure which does not crush the pieces 86 substantially. As described above with reference to the process of FIG. 6, the agglomerated pieces 86 of gas generating material remain substantially within the predetermined range of sizes, and remain generally distinct from each other, so as to be separable from each other by the brisance which results from actuation of the initiator 34 in the inflator 30 (FIG. 3). Therefore, in addition to being less than the pressure applied in the roll compactor 62, the pressure applied in the press 100 of FIG. 8 is less than the pressure at which the source grains 150 of gas generating material are formed from pressed quantities of particle mixture. For example, such source grains are known to be formed under a pressure of approximately 19 tons per square inch, whereas the grains 10 are most preferably formed under a pressure within the range of approximately 7 to approximately 14 tons per square inch, as noted above. The pressure applied in the press 100 of FIG. 8 is likewise less than the pressure at which the other source grains 152 are formed by pressing together spheronized granules of gas generating material.

From the above description of the invention, those skilled in the art will perceive improvements, changes and modifications. For example, any suitable alternative compactor apparatus can be substituted for the roll compactor 62 in the process of FIG. 6 or in the process of FIG. 8. The structure of the press 100 also could differ from the embodiment shown in FIG. 7. Such improvements, changes and modifications within the skill of the art are intended to be covered by the appended claims.

Having described the invention, the following is claimed:

1. A process for forming a grain of gas generating material which, when ignited, generates gas for inflating an inflatable vehicle occupant restraint, said process comprising:

forming separate pieces of gas generating material in steps including the step of pressing quantities of a particle mixture under a first pressure, said particle mixture including the ingredients of the gas generating material; and forming the grain of gas generating material as a compacted agglomeration of said pieces of gas generating material by pressing said pieces together under a second pressure which is less than said first pressure.

2. A process as defined in claim 1 wherein said second pressure is not great enough to crush said pieces of gas generating material substantially into separate particles, whereby said pieces remain generally distinct from each other as parts of said grain so as to be separable from each other by brisance upon ignition of said grain.

3. A process as defined in claim 1 wherein said first pressure compacts each of said quantities of said particle mixture into a corresponding one of said separate pieces of gas generating material.

4. A process as defined in claim 1 wherein said first pressure compacts said quantities of particle mixture together into a source grain of gas generating material, said step of forming said separate pieces of gas generating material further including the step of breaking said separate pieces from said source grain.

5. A process as defined in claim 1 wherein said first pressure is approximately 19 tons per square inch, said second pressure being within the range of approximately 7 to approximately 14 tons per square inch.

6. A process for forming a grain of gas generating material which, when ignited, generates gas for inflating an inflatable vehicle occupant restraint, said process comprising:

pressing loose quantities of a particle mixture under a first pressure, said particle mixture including the ingredients of the gas generating material, said first pressure compacting said loose quantities of particle mixture into separate pieces of gas generating material; and pressing a loose quantity of said separate pieces together under a second pressure which is less than said first pressure, said second pressure compacting said loose quantity of separate pieces into the grain of gas generating material.

7. A process as defined in claim 6 wherein said second pressure is not great enough to crush said pieces of gas generating material substantially into separate particles, whereby said separate pieces in said loose quantity remain generally distinct from each other as parts of said grain so as to be separable from each other by brisance upon ignition of said grain.

8. A process as defined in claim 6 further comprising the intermediate step of sorting said separate pieces of gas generating material into first and second batches of pieces, said first batch of pieces having sizes within a predetermined range of sizes, said second batch of pieces having sizes that are not within said predetermined range of sizes, said loose quantity of separate pieces being taken from said first batch of pieces.

9. A process as defined in claim 6 wherein said first pressure is approximately 19 tons per square inch, said second pressure being within the range of approximately 7 to approximately 14 tons per square inch.

10. A process for forming a grain of gas generating material which, when ignited, generates gas for inflating an inflatable vehicle occupant restraint, said process comprising:

forming separate pieces of gas generating material in steps including the step of pressing quantities of a particle mixture under a first pressure, said particle mixture including the ingredients of the gas generating material;

sorting said separate pieces of gas generating material into first and second batches of pieces, said first batch of pieces having sizes that are within a predetermined range of sizes, said second batch of pieces having sizes that are not within said predetermined range of sizes;

pressing a plurality of pieces taken from said first batch together under a second pressure to form the grain of gas generating material as a forcefully compacted agglomeration of said pieces taken from said first batch, said second pressure being less than said first pressure;

recycling said pieces in said second batch by forming an additional quantity of said separate pieces of gas generating material from said pieces in said second batch; and repeating said sorting and pressing steps with said additional quantity of said separate pieces of gas generating material.

11. A process as defined in claim 10 wherein said step of pressing quantities of a particle mixture under a first pressure forms said quantities of particle mixture into source grains of gas generating material, at least some of said separate pieces of gas generating material being formed by breaking said source grains.

12. A process as defined in claim 11 wherein said recycling step includes the step of breaking said pieces in said second batch into particles, and further includes the step of pressing loose quantities of said particles together under a third pressure to form said additional quantities of said separate pieces of gas generating material as compacted agglomerations of particles, said second pressure being less than said third pressure.

13. A process as defined in claim 10 wherein second pressure is not great enough to crush said pieces taken from said first batch substantially into separate particles, whereby said pieces taken from said first batch remain generally distinct from each other as parts of said grain so as to be separable from each other by brisance upon ignition of said grain.

14. A process as defined in claim 10 wherein said first pressure is approximately 19 tons per square inch, said second pressure being within the range of approximately 7 to approximately 14 tons per square inch.

15. A grain of gas generating material which, when ignited, generates gas for inflating an inflatable vehicle occupant restraint, said grain comprising:

compacted means for defining a plurality of generally distinct grain parts having sizes substantially within a predetermined range of sizes, each of said grain parts comprising a forcefully compacted agglomeration of particles, said particles together including the ingredients of said gas generating material;

said compacted means defining said grain of gas generating material as a less forcefully compacted agglomeration of said grain parts and enabling said grain parts to disperse as separate pieces having sizes substantially within said predetermined range of sizes when said grain is ignited.

16. A grain of gas generating material as defined in claim 15 wherein each of said grain parts has a size substantially within a range extending between a number 40 sieve size and a number 20 sieve size.

* * * * *